United States Patent
Champion et al.

(10) Patent No.: US 8,773,957 B1
(45) Date of Patent: Jul. 8, 2014

(54) DISK DRIVE DESTABILIZING MAGNETIZATION OF TEST PATTERN USING HEAD LASER TO ENHANCE DEFECT DETECTION

(71) Applicant: Western Digital Technologies, Inc., Irvine, CA (US)

(72) Inventors: Eric J. Champion, Longmont, CO (US); Kroum S. Stoev, Pleasanton, CA (US); Michael Alex, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/780,847

(22) Filed: Feb. 28, 2013

(51) Int. Cl.
*G11B 11/00* (2006.01)
(52) U.S. Cl.
USPC ..................................... 369/13.14; 369/13.02
(58) Field of Classification Search
None
See application file for complete search history.

(56) References Cited

U.S. PATENT DOCUMENTS

| | | |
|---|---|---|
| 4,949,036 A | 8/1990 | Bezinque et al. |
| 6,830,824 B2 | 12/2004 | Kikitsu et al. |
| 7,352,658 B2 | 4/2008 | Shimazaki et al. |
| 7,532,422 B2 | 5/2009 | Meier et al. |
| 7,656,763 B1 | 2/2010 | Jin et al. |
| 7,702,973 B2 * | 4/2010 | Mead et al. .................... 714/723 |
| 7,773,331 B2 | 8/2010 | Akagi et al. |
| 8,179,624 B2 | 5/2012 | Inomata |
| 2002/0191672 A1 | 12/2002 | Abraham et al. |
| 2006/0109000 A1 | 5/2006 | Makino et al. |
| 2008/0074776 A1 | 3/2008 | Soeya |
| 2012/0195176 A1 | 8/2012 | Inomata |

* cited by examiner

*Primary Examiner* — Brenda Bernardi

(57) ABSTRACT

A disk drive is disclosed comprising a head actuated over a disk, wherein the head comprises a write element, a read element, and a laser operable to heat the disk while writing data to the disk. The disk is magnetized by writing a first test pattern to the disk using the write element and a first power applied to the laser. The magnetization of the first test pattern is destabilized by heating the disk using a second power applied to the laser, wherein the second power is less than the first power. After destabilizing the magnetization of the first test pattern, the first test pattern is read with the read element to generate a read signal, and the read signal is evaluated to detect a defect on the disk.

14 Claims, 4 Drawing Sheets

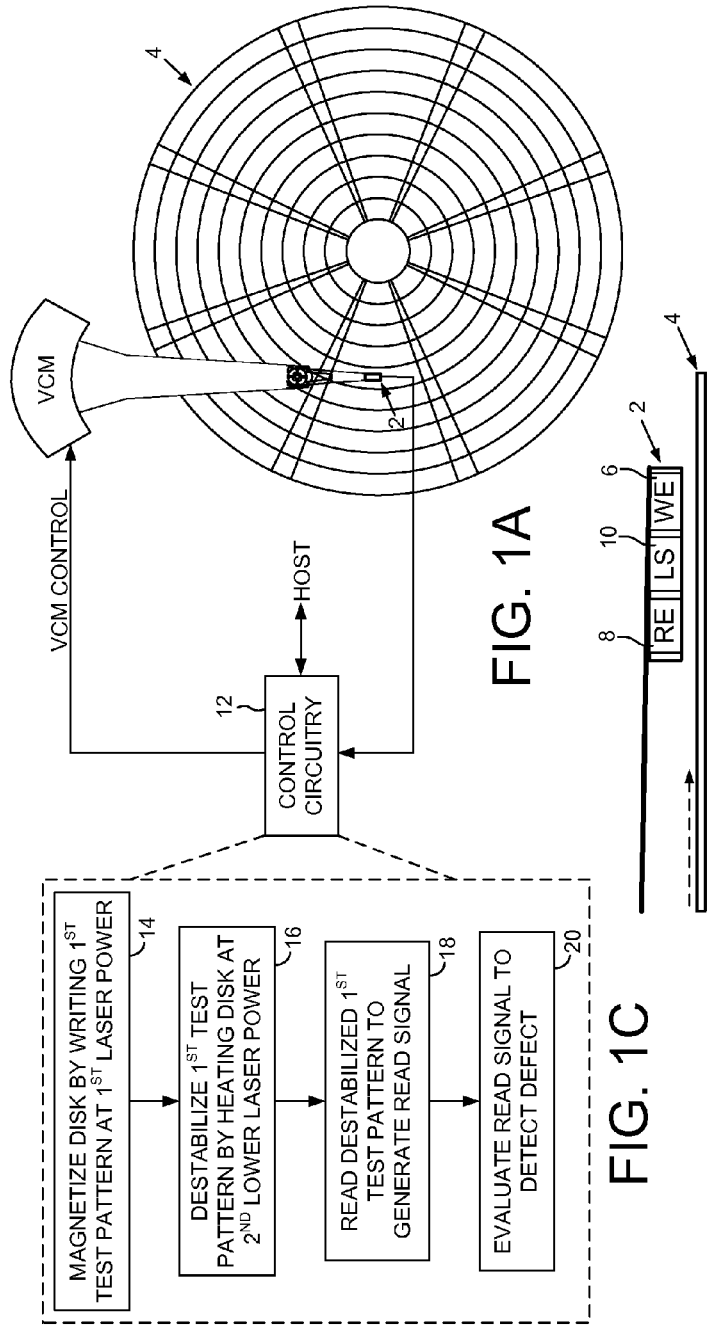
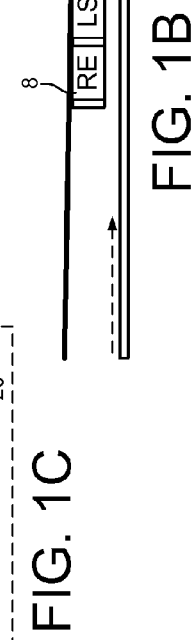
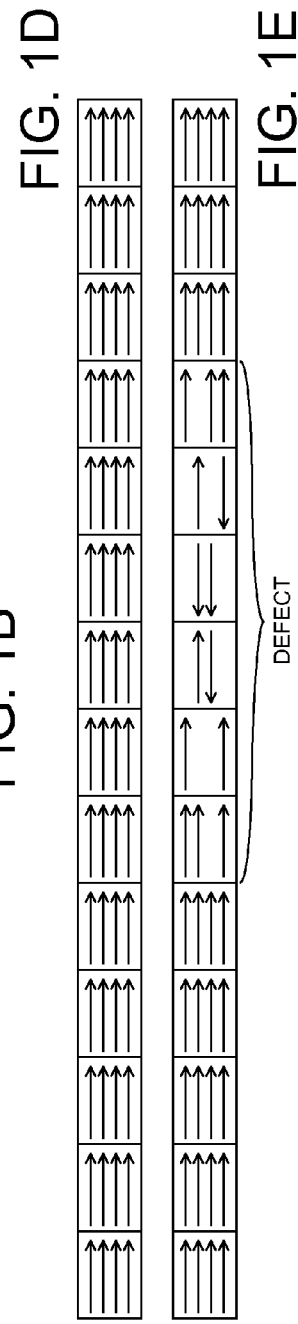

DISK DRIVE DESTABILIZING MAGNETIZATION OF TEST PATTERN USING HEAD LASER TO ENHANCE DEFECT DETECTION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk.

A defect scan may be executed to detect defects on the disk, wherein the defect scan typically involves writing/reading a test pattern to/from the disk and detecting anomalies in the resulting read signal. The defect scan may be executed by a suitable developmental disk drive (e.g., a spin stand) that may evaluate a number of disks provided by a particular vendor in order to ensure quality control as well as provide feedback to improve the disk fabrication process. The defect scan may also be performed by each production disk drive after the disks are installed in order to perform the above described defect mapping operation during manufacturing as well as while in the field.

BRIEF DESCRIPTION OF THE DRAWINGS

FIG. 1A shows a disk drive according to an embodiment comprising a head actuated over a disk.

FIG. 1B shows a head according to an embodiment comprising a write element, a read element, and a laser operable to heat the disk while writing data to the disk.

FIG. 1C is a flow diagram according to an embodiment wherein the disk is magnetized by writing a first test pattern to the disk using the write element and a first power applied to the laser, and then the magnetization of the first test pattern is destabilized by heating the disk using a second, lower power applied to the laser to facilitate detecting defects on the disk.

FIGS. 1D and 1E illustrate an embodiment wherein heating the disk with the head laser causes a defect to more readily demagnetize and therefore more likely manifest in the read signal during the defect scan.

DETAILED DESCRIPTION

Figure 2:
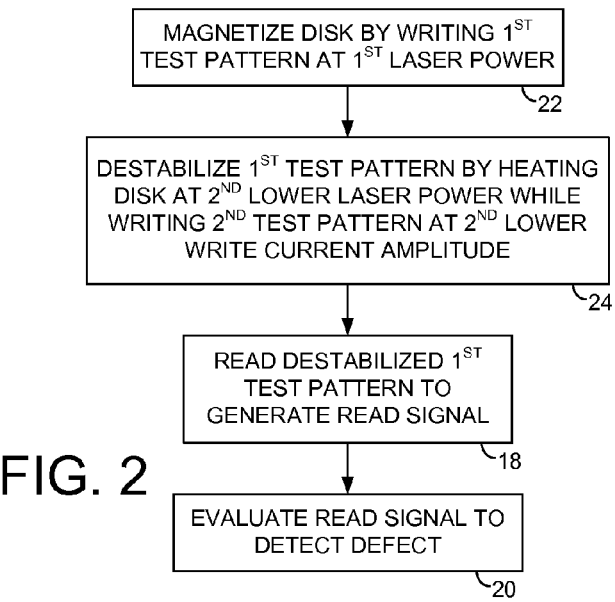
FIG. 2 is a flow diagram according to an embodiment wherein the first test pattern is overwritten with a second test pattern at a lower write current while heating the disk with the head laser to destabilize the magnetization of the first test pattern.

FIG. 1A shows a disk drive according to an embodiment comprising a head 2 actuated over a disk 4, wherein the head 2 comprises a write element 6, a read element 8, and a laser 10 (FIG. 1B) operable to heat the disk 4 while writing data to the disk 4. The disk drive further comprises control circuitry 12 operable to execute the flow diagram of FIG. 1C, wherein the disk is magnetized by writing a first test pattern to the disk using the write element and a first power applied to the laser (block 14). The magnetization of the first test pattern is destabilized by heating the disk using a second power applied to the laser, wherein the second power is less than the first power (block 16). After destabilizing the magnetization of the first test pattern, the first test pattern is read with the read element to generate a read signal (block 18), and the read signal is evaluated to detect a defect on the disk (block 20).

Any suitable laser 10 may be employed in the embodiments, such as a suitable laser diode fabricated with the head 2. In addition, any suitable optics may be employed to focus the laser on the disk surface during a write operation, such as a suitable waveguide and near field transducer for focusing the light emitted by a laser diode into a spot on the disk surface. In one embodiment, when writing data to the disk (e.g., the first test pattern) the laser power is set to a level that ensures the media is heated above its Curie point, thereby reducing the media's coercivity which allows the media to be magnetized by the write element 6. Any suitable write element 6 may be employed, such as a suitable inductive coil that generates a magnetic field for magnetizing the disk when energized with a write current.

FIG. 1D illustrates an embodiment wherein a first test pattern in the form of a DC pattern is written to the disk so as to align the magnetic domains in each bit cell into a uniform polarity which is represented by the directional arrows pointing from left to right. Any suitable laser power may be employed to write the first test pattern, such as the laser power employed during a normal write operation of the disk drive, or a laser power that may be somewhat lower or higher than the normal write power. After writing the first test pattern to the disk using the first laser power, the head is passed over the first test pattern while applying a second power to the laser that is lower than the first power used to write the test pattern. In one embodiment, the second, lower laser power heats the disk to less than its Curie point so as to marginally reduce its coercivity and thereby destabilize the magnetization of the first test pattern. The destabilizing effect of the second laser power may cause a defective area on the disk to more readily demagnetize as illustrated in FIG. 1E. Accordingly, after destabilizing the magnetization of the first test pattern, the defective areas on the disk may be detected by reading the first test pattern and evaluating the read signal using any suitable technique. In one embodiment, a relationship between the laser power and the resulting reduction in coercivity may be characterized, and this relationship may be used to select the second, lower laser power for destabilizing the magnetization of the first test pattern.

Although in the embodiment of FIG. 1D the magnetic domains are shown as being magnetized in a horizontal orientation with respect to the disk surface (e.g., longitudinal magnetic recording), in other embodiments the magnetic domains may be magnetized in a vertical orientation (e.g., perpendicular magnetic recording) with respect to the disk surface (or any other suitable orientation). In addition, the first test pattern may comprise any suitable pattern other than a DC pattern. For example, in one embodiment the first test pattern may comprise an AC pattern, and in other embodiments the first test pattern may comprise a random pattern or a pattern comprises any number of desired frequency components. In an embodiment described below, the first test pattern may be used to detect the defects on the disk by comparing the first test pattern to the data sequence detected when reading the first test pattern from the disk.

Any suitable second laser power may be employed to destabilize the magnetization of the first test pattern, wherein in one embodiment the second laser power may be selected based on the coercivity characteristics of the magnetic material used to fabricate the disk. For example, in one embodiment a second laser power equal to approximately fifty percent of the first laser power may be used to destabilize the magnetization of the first test pattern. In other embodiments, the second laser power may be calibrated so that a certain percentage of the disk (or section of the disk) is mapped out as defective. That is, if too few defects are being detected the second laser power may be increased during the defect scan operation, and if too many defects are being detected the second laser power may be decreased. In another embodiment described below, the second laser power may be varied during the defect scan process in order to detect different types of defects or to characterize the growth of defects.

In one embodiment, the magnetization of the first test pattern may be destabilized by a combination of applying the second power to the laser together with applying a lower amplitude write current to the head while the head passes over the first test pattern. In this manner, a destabilizing magnetic field is applied to the disk by the write element together with the destabilizing effect of the second laser power. This embodiment is understood with reference to the flow diagram of FIG. 2 wherein after magnetizing the disk by writing the first test pattern at the first laser power (block 22), the magnetization of the first test pattern is destabilized by applying the second, lower laser power while simultaneously applying a lower amplitude write current to the head (block 24). Any suitable write current amplitude may be used to help destabilize the magnetization of the first test pattern, such as any suitable percentage of the write current amplitude used to write the first test pattern to the disk. Similar to the laser power, the write current amplitude used to destabilize the magnetization may be calibrated based on any suitable criteria, such as a desired percentage of defects detected on the disk (or section of the disk).

In one embodiment, the first test pattern may be destabilized by overwriting the first test pattern with a second test pattern using a lower write current amplitude than that used to write the first test pattern. In addition, the second test pattern may be different in phase from the first test pattern, such as writing the second pattern with an opposite phase from the first test pattern. Referring to the example of FIG. 1D wherein the first test pattern is written as a DC pattern having a first polarity, the second test pattern may be written as a DC pattern (at a lower write current amplitude) having a second polarity opposite the first polarity. The opposing magnetic field of the write element may provide a more optimal destabilizing effect of the first test pattern so that defects are more readily detected. In one embodiment, the write current amplitude may be varied when destabilizing the first test pattern in order to detect different types of defects or to characterize the growth of defects.

Figure 3A:
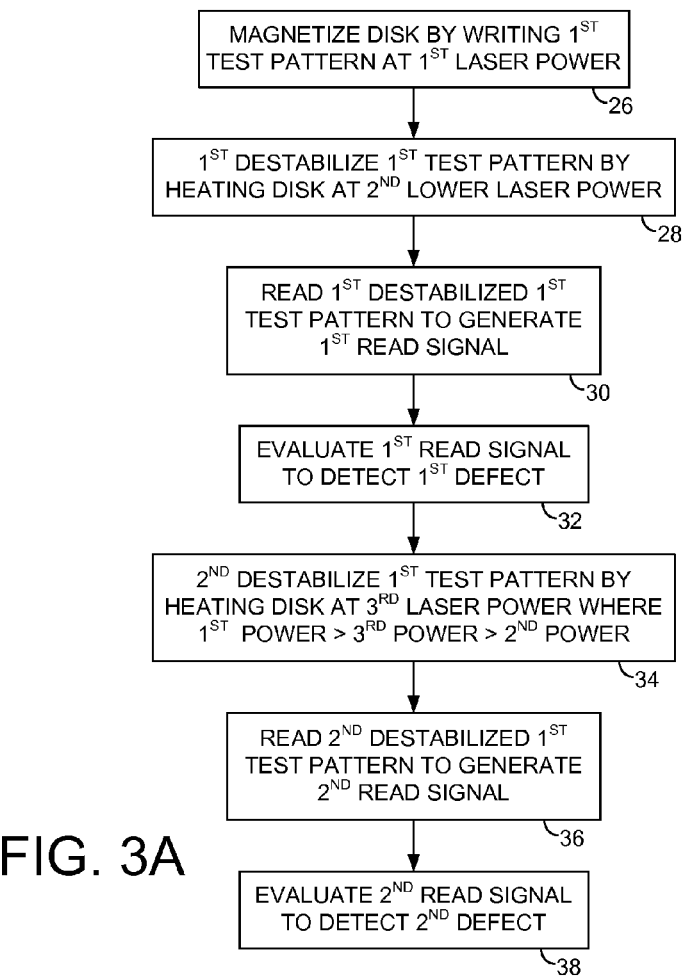
FIG. 3A is a flow diagram according to an embodiment wherein the first test pattern is destabilized at different laser powers in order to detect different types of defects or to characterize the growth of defects.

In one embodiment, the laser power is adjusted to different levels to provide different extents of destabilization which may allow different types of defects to be detected, or allow the growth of defects to be characterized. FIG. 3A is a flow diagram illustrating an example of this embodiment, wherein after writing the first test pattern at a first laser power (block 26) and destabilizing the first test pattern using a second laser power (block 28), the first test pattern is read (block 30) and the read signal evaluated to detect a first defect (block 32). The first test pattern is then further destabilized by applying a third laser power that is greater than the second laser power (block 34) but still less than the first laser power. The first test pattern is then read again (block 36) and the read signal evaluated to detect a second defect (block 38). In one embodiment, the second defect may be separate from the first defect, and in another embodiment, the second defect may be a continuation of the first defect and therefore provide information about the growth of defects. In one embodiment, the first test pattern may be destabilized using an incrementally increasing laser power and the resulting defects evaluated in order to characterize the general stability of the magnetic medium. For example, the increasing rate of detected defects (or growth of defects) relative to the increasing laser power used to destabilize the first test pattern may provide valuable information regarding the hysteretic longevity of recorded data, including information for configuring an interval for refreshing (rewriting) data while the disk drive is deployed in the field.

Figure 3B:
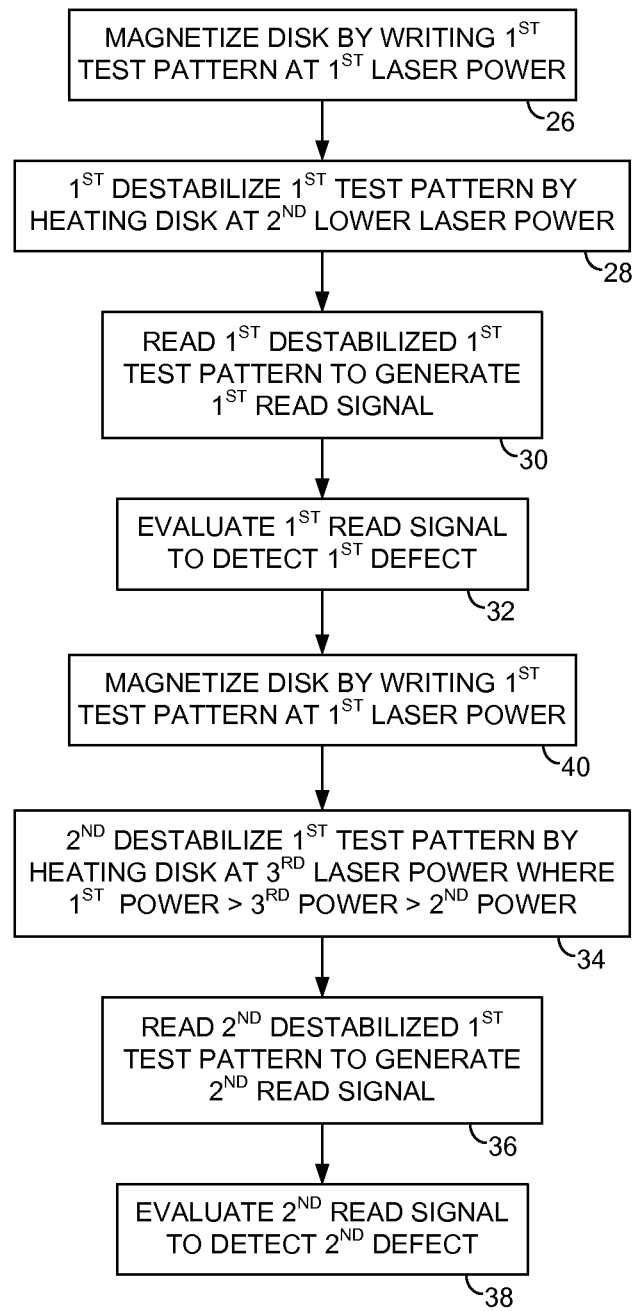
FIG. 3B is a flow diagram according to an embodiment wherein the first test pattern is rewritten and then destabilized using different laser powers in order to detect different types of defects or to characterize the growth of defects.

In the embodiment of FIG. 3A the first test pattern is not rewritten prior to further destabilizing the first test pattern at block 34. In an alternative embodiment shown in the flow diagram of FIG. 3B, the first test pattern may be rewritten to the disk (block 40) using the write element and the first laser power prior to second destabilizing the magnetization of the first test pattern at block 34. This embodiment may provide additional information about the stability of the magnetic medium, including information about different types of defects that may manifest, as well as characterize the growth of defects, relative to the different levels of destabilizing laser power applied after magnetizing the disk at the first laser power.

Any suitable technique may be used in the above described embodiments to detect defects on the disk in response to the read signal. In one embodiment, the amplitude or phase of the read signal may be evaluated to detect defects. For example, a defect may cause the amplitude of the read signal to increase or decrease, or a defect may cause the phase of the read signal to shift, and therefore the defect may be detected using any suitable signal processing technique. In another embodiment, a suitable quality metric related to the quality of the read signal may be evaluated to detect defects, such as by extracting and evaluating the noise power in the read signal, or by evaluating a quality metric of a sequence detector, such as the branch metrics of a trellis sequence detector, or the log-likelihood ratios of an iterative detector.

Figure 4:
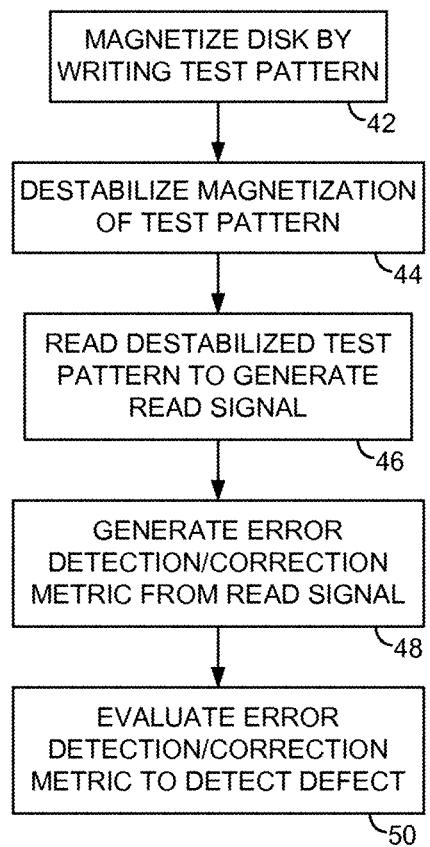
FIG. 4 is a flow diagram according to an embodiment wherein an error detection and/or correction metric is evaluated in order to detect the defects on the disk.

FIG. 4 is a flow diagram according to an embodiment wherein a defect may be detected by evaluating an error detection/correction metric associated with a sequence detector. The disk is magnetized by writing a test pattern using the first laser power (block 42), and the test pattern is destabilized by passing the head over the test pattern with a second laser power (block 44). The test pattern is then read to generate a read signal (block 46), and the read signal is evaluated to generate an error detection/correction metric (block 48), where the error detection/correction metric is evaluated to detect a defect on the disk (block 50). Any suitable error detection/correction metric may be generated at block 48, such as a number of bit errors detected/corrected in an estimated data sequence generated by demodulating the read signal. Any suitable technique may be used to detect the bit errors, such as by comparing the test pattern written at step 42 to the estimated data sequence generated by the sequence detector. In another embodiment, the sequence detector may employ a suitable error correction code (ECC) such as a Reed-Solomon code capable of detecting the number of bit errors in an estimated data sequence output by a trellis detector or an iterative detector. In yet another embodiment, the sequence detector may comprise an iterative detector, and the error detection/correction quality metric may comprise a number of iterations needed to accurately recover the test pattern from the read signal.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

As will be apparent, many variations on the systems and methods described above are possible. For example, while the above disclosure has described processes as performed for "each" sector, zone or other disk portion, in some cases, the processes may be performed for only one or some of the disk portions and not necessarily for each of the disk portions.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk;
    a head actuated over the disk, wherein the head comprises a write element, a read element, and a laser operable to heat the disk while writing data to the disk; and
    control circuitry operable to:
        magnetize the disk by writing a first test pattern to the disk using the write element and a first power applied to the laser;
        destabilize the magnetization of the first test pattern by heating the disk using a second power applied to the laser, wherein the second power is less than the first power;
        after destabilizing the magnetization of the first test pattern, read the first test pattern with the read element to generate a read signal; and
        evaluate the read signal to detect a defect on the disk.

2. The disk drive as recited in claim 1, wherein destabilizing the magnetization of the first test pattern further comprises applying a magnetic field to the disk using the write element.

3. The disk drive as recited in claim 2, wherein destabilizing the magnetization of the first test pattern comprises applying the magnetic field to the disk at a lower strength than when writing the test pattern to the disk.

4. The disk drive as recited in claim 2, wherein destabilizing the magnetization of the first test pattern comprises writing a second test pattern over the first test pattern.

5. The disk drive as recited in claim 4, wherein the second test pattern is different in phase from the first test pattern.

6. The disk drive as recited in claim 1, wherein the control circuitry is further operable to:
    first destabilize the magnetization of the first test pattern by heating the disk using a second power applied to the laser, wherein the second power is less than the first power;
    after first destabilizing the magnetization of the first test pattern, first read the first test pattern to generate a first read signal and evaluate the first read signal to detect a first defect on the disk;
    second destabilize the magnetization of the first test pattern by heating the disk using a third power applied to the laser, wherein the third power is greater than the second power; and
    after second destabilizing the magnetization of the first test pattern, second read the first test pattern to generate a second read signal and evaluate the second read signal to detect a second defect on the disk.

7. The disk drive as recited in claim 6, wherein the control circuitry is further operable to rewrite the first test pattern to the disk using the write element and the first power applied to the laser prior to second destabilizing the magnetization of the first test pattern.

8. A method of operating a disk drive comprising a head actuated over a disk, wherein the head comprises a write element, a read element, and a laser operable to heat the disk while writing data to the disk, the method comprising:
  magnetizing the disk by writing a first test pattern to the disk using the write element and a first power applied to the laser;
  destabilizing the magnetization of the first test pattern by heating the disk using a second power applied to the laser, wherein the second power is less than the first power;
  after destabilizing the magnetization of the first test pattern, reading the first test pattern with the read element to generate a read signal; and
  evaluating the read signal to detect a defect on the disk.

9. The method as recited in claim 8, wherein destabilizing the magnetization of the first test pattern further comprises applying a magnetic field to the disk using the write element.

10. The method as recited in claim 9, wherein destabilizing the magnetization of the first test pattern comprises applying the magnetic field to the disk at a lower strength than when writing the test pattern to the disk.

11. The method as recited in claim 9, wherein destabilizing the magnetization of the first test pattern comprises writing a second test pattern over the first test pattern.

12. The method as recited in claim 11, wherein the second test pattern is different in phase from the first test pattern.

13. The method as recited in claim 8, further comprising:
  first destabilizing the magnetization of the first test pattern by heating the disk using a second power applied to the laser, wherein the second power is less than the first power;
  after first destabilizing the magnetization of the first test pattern, first reading the first test pattern to generate a first read signal and evaluating the first read signal to detect a first defect on the disk;
  second destabilizing the magnetization of the first test pattern by heating the disk using a third power applied to the laser, wherein the third power is greater than the second power; and
  after second destabilizing the magnetization of the first test pattern, second reading the first test pattern to generate a second read signal and evaluating the second read signal to detect a second defect on the disk.

14. The method as recited in claim 13, further comprising rewriting the first test pattern to the disk using the write element and the first power applied to the laser prior to second destabilizing the magnetization of the first test pattern.

* * * * *